United States Patent
Untch

(10) Patent No.: US 8,590,557 B2
(45) Date of Patent: Nov. 26, 2013

(54) DUAL FLAP DEVICE FOR THE ENVIRONMENTALLY TIGHT CONNECTION OF TWO RECEPTACLES

(75) Inventor: Günter Untch, Müllheim (DE)

(73) Assignee: Andocksysteme G. Untch GmbH, Badenweiler (DE)

( * ) Notice: Subject to any disclaimer, the term of this patent is extended or adjusted under 35 U.S.C. 154(b) by 144 days.

(21) Appl. No.: 13/378,483

(22) PCT Filed: Jun. 15, 2010

(86) PCT No.: PCT/EP2010/003591
§ 371 (c)(1),
(2), (4) Date: Jan. 18, 2012

(87) PCT Pub. No.: WO2010/145804
PCT Pub. Date: Dec. 23, 2010

(65) Prior Publication Data
US 2012/0111443 A1    May 10, 2012

(30) Foreign Application Priority Data
Jun. 15, 2009    (DE) .......................... 10 2009 025 290

(51) Int. Cl.
*F16K 27/02*    (2006.01)
*F16K 1/18*    (2006.01)

(52) U.S. Cl.
USPC .............. 137/15.25; 137/315.17; 137/614.01; 137/614.06

(58) Field of Classification Search
USPC .............. 137/315.17, 614.01, 614.02, 15.18, 137/15.25, 614.06
See application file for complete search history.

(56) References Cited

U.S. PATENT DOCUMENTS

| | | | |
|---|---|---|---|
| 5,295,507 A * | 3/1994 | Bandy et al. | 137/614.01 |
| 6,807,979 B2 * | 10/2004 | Koch et al. | 137/614.06 |
| 6,913,048 B2 | 7/2005 | Koch et al. | |
| 2010/0084049 A1 | 4/2010 | Smith et al. | |
| 2010/0126622 A1 | 5/2010 | Koch et al. | |

FOREIGN PATENT DOCUMENTS

| | | |
|---|---|---|
| DE | 200 14 871 U1 | 2/2001 |
| DE | 100 10 995 A1 | 8/2001 |
| EP | 1 213 244 A1 | 6/2002 |
| EP | 1 245 895 A1 | 10/2002 |
| EP | 2 179 949 A2 | 4/2010 |
| WO | WO 2008/071181 A2 | 6/2008 |
| WO | WO 2010/092395 A1 | 8/2010 |

* cited by examiner

*Primary Examiner* — Kevin Lee
(74) *Attorney, Agent, or Firm* — Muirhead and Saturnelli, LLC

(57) ABSTRACT

A dual flap device for the environmentally tight connection of two receptacles is provided with two housing halves, which can be releasably connected. Each housing half accommodates a flap, which is pivotable by way of a half shaft. In a connected position of the dual flap device, the housing halves and the flaps rest against each other and are tensioned against one another, respectively. The half shafts of the two flaps unite to form a mutual shaft having a rotational axis. Thus, using a locking device, both flaps can be pivoted between a closed position and an open position by way of the mutual shaft. A first housing half is provided with a locking device, at least on one side, located in axial extension of the respective half shaft, which makes it possible to switch the dual flap device between an unlocked and a locked position.

18 Claims, 12 Drawing Sheets

DUAL FLAP DEVICE FOR THE ENVIRONMENTALLY TIGHT CONNECTION OF TWO RECEPTACLES

TECHNICAL FIELD

This application relates to a dual flap device for the environmentally tight connection of two receptacles.

BACKGROUND OF THE INVENTION

In different branches of process engineering systems and also in other production, storage or transport devices, containers or tubes in the form of receptacles frequently have to be connected to one another in order to produce an exchange of a flowable product. In this case, it may be of importance for receptacles of this type always to remain closed such that there is no risk of contamination of the contents of the receptacles or of the surroundings thereof.

Known dual flap devices in the form of couplings produce connections between receptacles of this type, wherein each of the receptacles is closed by a flap mounted rotatably in a housing half. Only when the connection has been produced can the flaps be rotated together, and therefore the flowable product can be transferred in a flow direction from a first of the receptacles into a second of the receptacles. Said connection is intended to be substantially environmentally tight. Even during the transfer, the product remains sealed as tightly as possible in the interior and is enclosed by the dual flap device.

Known dual flap devices are disclosed, for example, in EP 1 213 244 B1 or DE 200 14 871 U1.

The sealing of the receptacles before, during and after the transfer of the product is to be further improved and simplified in comparison to known dual flap devices. One reason for sealing problems is an insecure or incomplete connection or an insecure fastening of the housing halves in which the flaps or the dual flap are/is mounted.

In addition, the handling of known dual flap devices is often complicated and error-prone. For example, an undefined number of levers having different functions can be actuated. Sometimes, the housing halves can be connected in a plurality of positions, with it being possible that the flaps never come to lie exactly one above the other due to manufacturing tolerances.

Accordingly, it is desirable to solve the above-mentioned problems and to provide a dual flap device which is simple to handle, can be connected securely and environmentally tightly and can be used flexibly.

SUMMARY OF THE INVENTION

The system described herein enables an environmentally tight connection of two receptacles, in particular a controlled transfer of a flowable product, in a flow direction from a first into a second of the receptacles with a dual flap device having two housing halves which each comprise a flap. The flaps each close the housing halves and therefore one tubular cross section each of one of the receptacles transversely with respect to the flow direction.

A releasable connection can be produced between the housing halves. If the connection is produced, the housing halves and the flaps mounted therein bear against each other and are braced against each other.

An appropriate shape of the flap is selected according to the shape of the tubular cross section. As a rule, a connecting piece having a round cross section has to be closed. In this case, a housing half having a round flap is flange-mounted on the connecting piece.

Rotation of the flaps bearing against each other about a common axis of rotation causes the flaps to be oriented in the flow direction in order to reach an open position such that the tubular cross section is no longer closed. In the open position, the flowable product can flow through the dual flap device past the flaps or the dual flap.

Along the axis of rotation, the flaps have half shafts on both sides, the half shafts being mounted pivotably in the associated housing half. In the connected dual flap device, the half shafts of the two flaps coincide to form a common shaft having the axis of rotation.

In an axial extension of the respective half shaft, a first of the housing halves has, at least on one side of the respective flap, a locking device. The locking device produces the releasable connection between the housing halves and braces the housing halves against each other. By means of rotation about the axis of rotation, the locking device adjusts the dual flap device between an unlocking position and a locking position.

The dual flap device according to the system described herein is particularly simple to handle, especially if tubes or other lines have to be connected to each other or docked on each other. In addition, the axial arrangement of the locking device and the rotatability thereof about the axis of rotation of the flaps open up the possibility of combining the locking device with the adjusting device.

In an advantageous embodiment, it is provided that, in an axial extension of the respective half shaft, a second of the housing halves has, at least on one side of the respective flap, a locking element. Said locking element interacts with the locking device. In the locking position, the locking element of the second housing half can be at least partially engaged around by the locking device of the first housing half.

For this purpose, the locking device may be actuated by a locking lever. If the locking device is rotated about the axis of rotation, it gradually encloses an ever larger section of the circumference of the locking element.

In a further embodiment, a securing device makes provision for the rotation of the locking device for complete enclosing of the locking element to have to be carried out before the adjusting device can be actuated.

Protection against unintentional adjustments is therefore further increased.

In a further embodiment, in an axial extension of the respective half shaft, the two housing halves both have a locking device, but on only one side of the respective flap. This consequently involves identical or virtually identical housing halves which can be docked on each other in only one orientation with respect to each other. Preferably, embodiments of this type have, opposite the locking device, locking element for the corresponding locking device of the other housing half to engage around.

A consistently predetermined position of the flaps on each other and the flexibility obtained are advantageous because housing halves of this type always fit on each other and there is not a positive element and a negative element. A prerequisite is only that the flaps of the two housing halves match each other in shape and size.

A further embodiment has a control element, which is common to the adjusting device and the locking device, and a coupling element. As the common control element, it may be preferable for a common lever to be actuable for both devices. A first partial rotation of the control element is reserved, for example, for the locking device whereas a second partial rotation of the control element controls the adjusting device.

However, the adjusting device is intended to be actuable only when the housing halves are definitively connected to each other. For this purpose, the coupling element couples the adjusting device and the locking device to each other in such a manner that, by means of the common control element, the releasable connection between the housing halves can be produced and the housing halves can be braced against each other in the first partial rotation, and, in the second partial rotation, the two flaps can be pivoted via the common shaft between the closed position and the open position.

The coupling element may be designed as a spring-loaded pin in a hub in such a manner that, in a loaded state, the pin releases the adjusting device for rotation in the locking device. By contrast, in an unloaded state, the pin blocks the devices in relation to each other. The pivoting of the flaps is therefore possible only while the housing halves are locked. Consequently, the locking can be released only when the flaps are closed.

A user-friendly reduction in the number of control members can be achieved as a result, which leads to increased operational reliability.

The dual flap device according to the system described herein is particularly advantageously used in process engineering systems.

BRIEF DESCRIPTION OF THE DRAWINGS

Embodiments of the system described herein are explained in more detail below with reference to figures, in which.

DETAILED DESCRIPTION OF VARIOUS EMBODIMENTS

In the figures, identical or functionally identical elements are provided with the same reference signs—unless otherwise stated. For better clarity, not all of the reference signs are entered in all of the figures.

Figure 1:
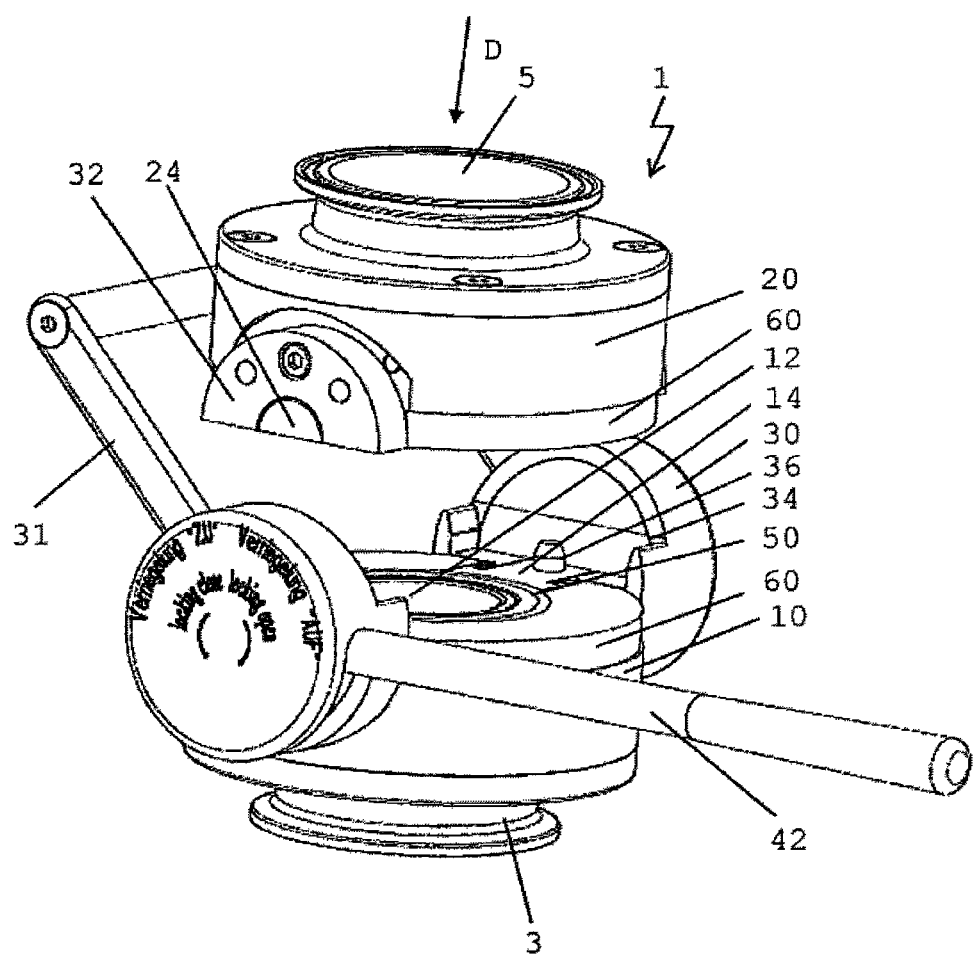
FIG. 1 shows a perspective illustration of a dual flap device according to a first exemplary embodiment, wherein a first and a second housing half differ from each other and stand by opposite each other, oriented in the flow direction and spaced apart from each other, i.e. are not yet docked to each other.
Figure 2:
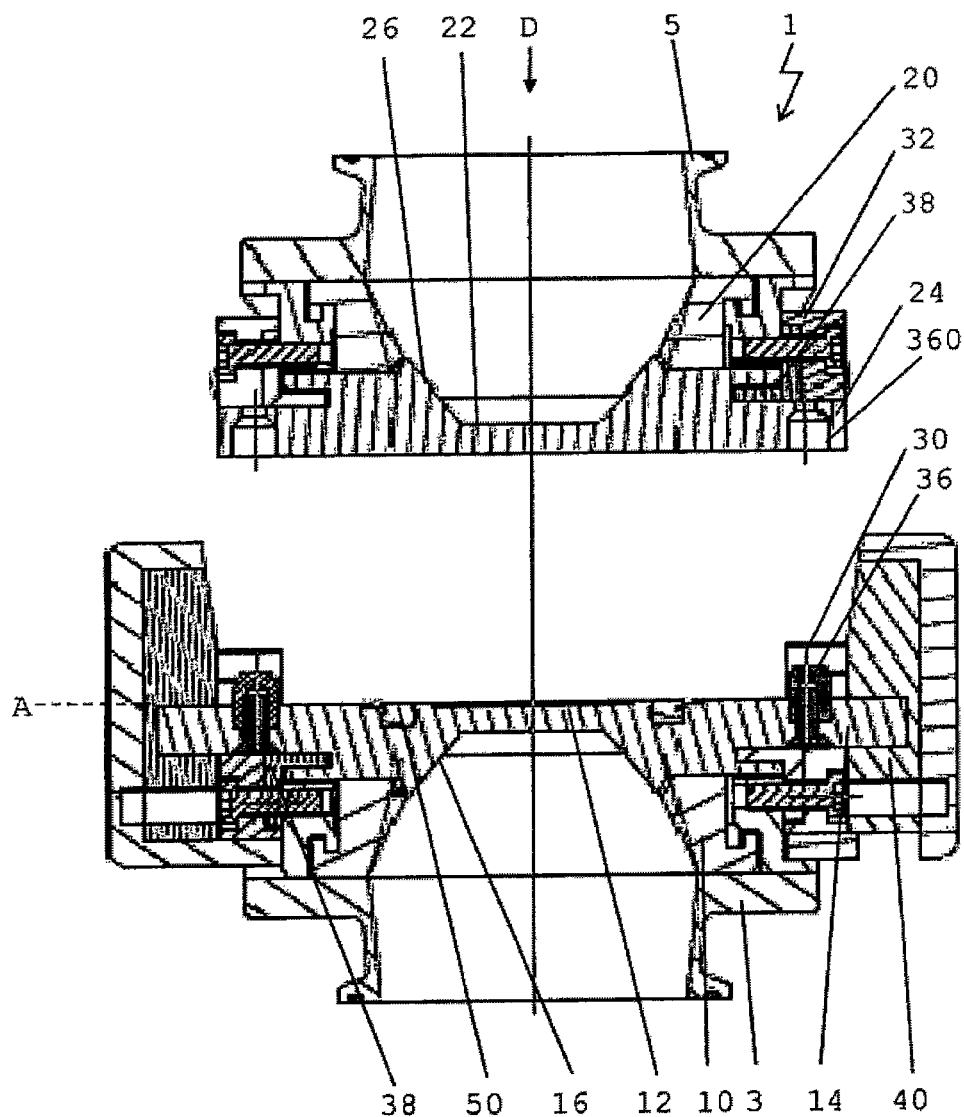
FIG. 2 shows a section through the dual flap device from FIG. 1 along the axis of rotation.
Figure 3:
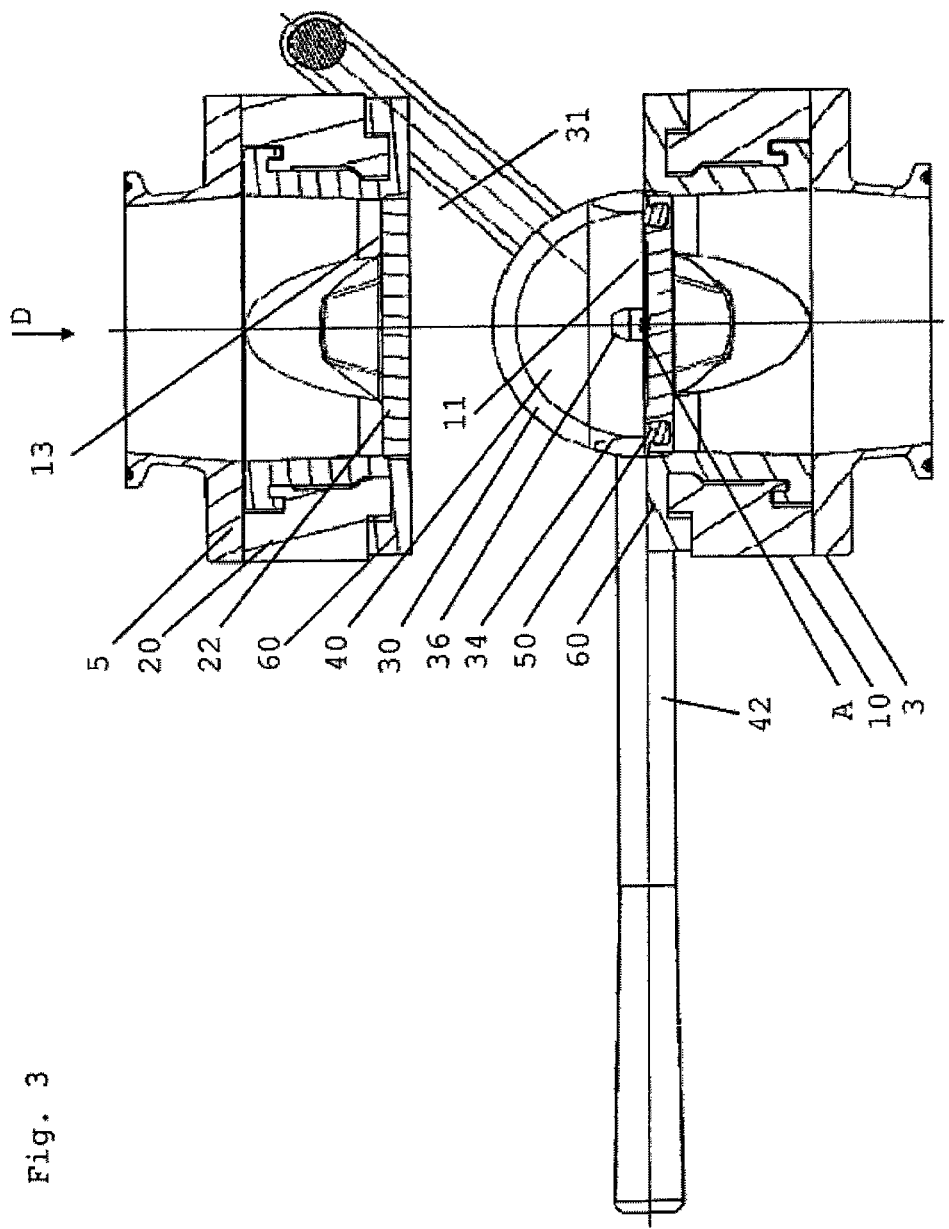
FIG. 3 shows a section through the dual flap device from FIG. 1 transversely with respect to the axis of rotation.

FIGS. 1 to 7 illustrate a dual flap device 1 according to a first exemplary embodiment. The dual flap device 1 consists of a first housing half 10 and a second housing half 20, between which a releasable connection can be produced. The housing halves 10, 20 are illustrated in FIGS. 1 to 3 spaced apart from each other and oriented in the flow direction with respect to each other. FIGS. 4 to 7 show the dual flap device 1 with housing halves 10, 20 bearing against each other. In this state, reference is also made to housing halves 10, 20 which are docked on each other.

If the housing halves 10, 20 according to FIGS. 1 to 7 bear against each other, the dual flap device 1 can be adjusted between an unlocking and a locking position.

Figure 4:
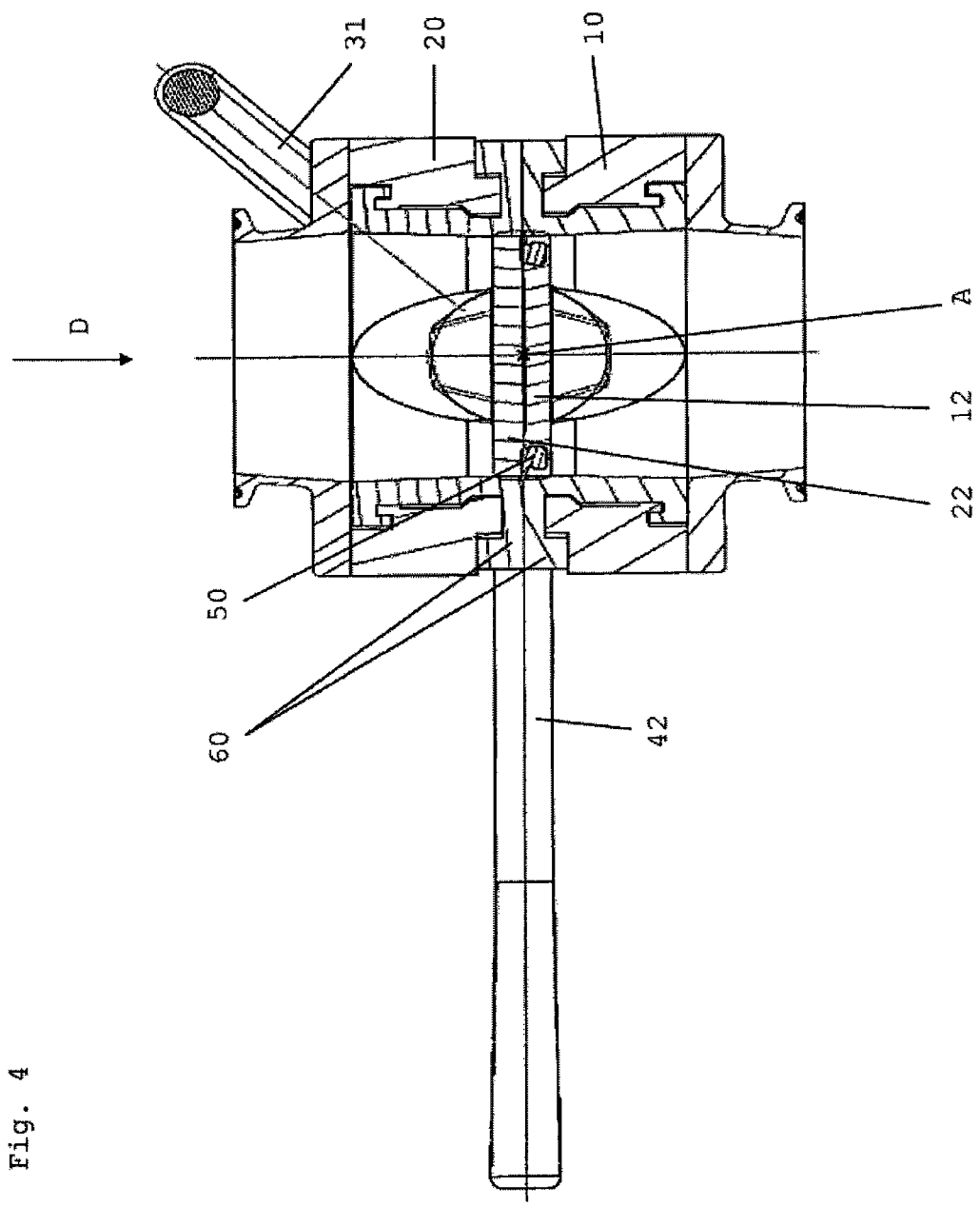
FIG. 4 shows a section through the dual flap device from FIG. 1 according to FIG. 3, wherein the housing halves are docked on each other but are not yet locked to each other (unlocking position) and the flaps are in a closed position.
Figure 5:
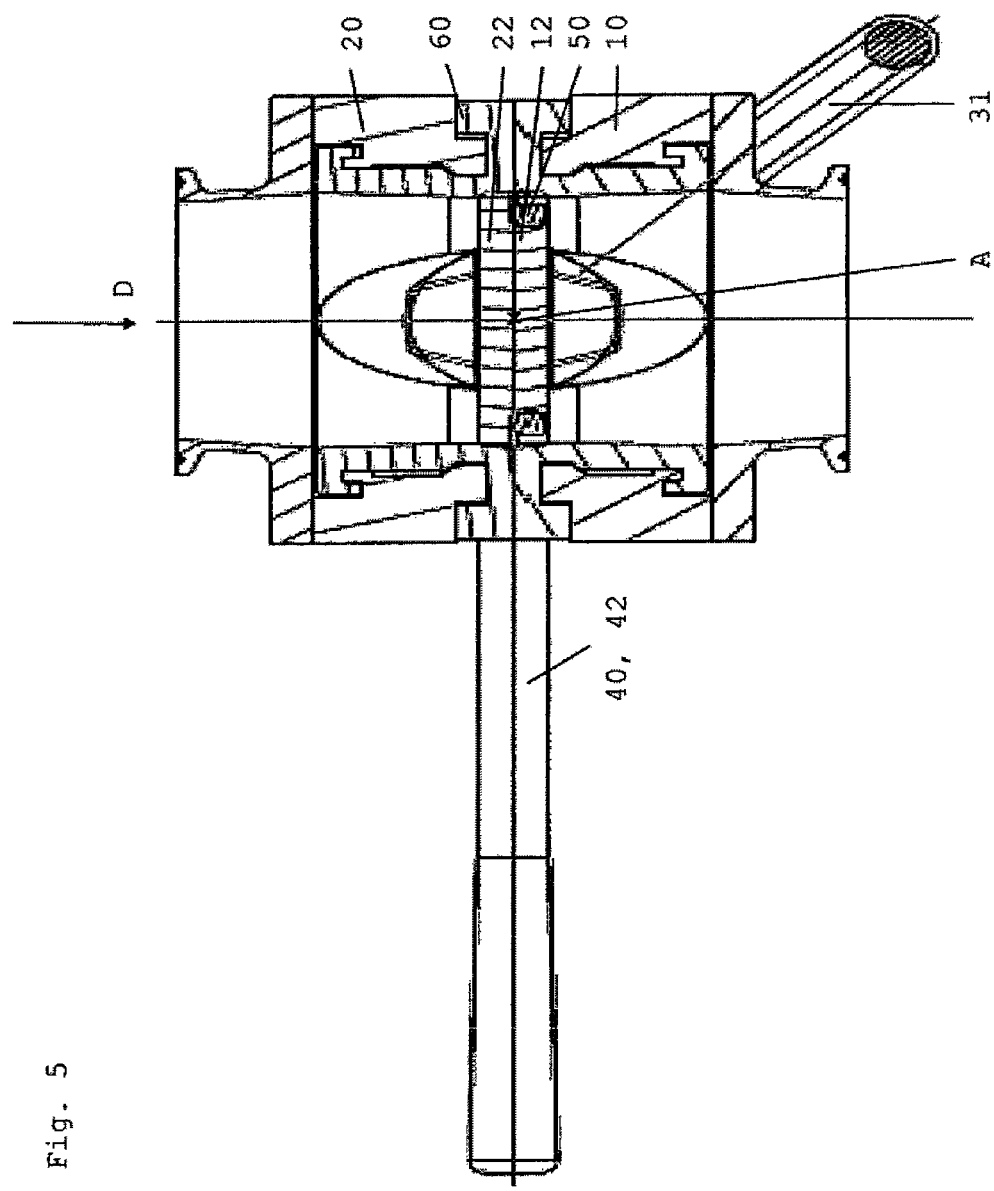
FIG. 5 shows a section through the dual flap device from FIG. 1 according to FIG. 4, wherein the housing halves are in a locking position.
Figure 6:
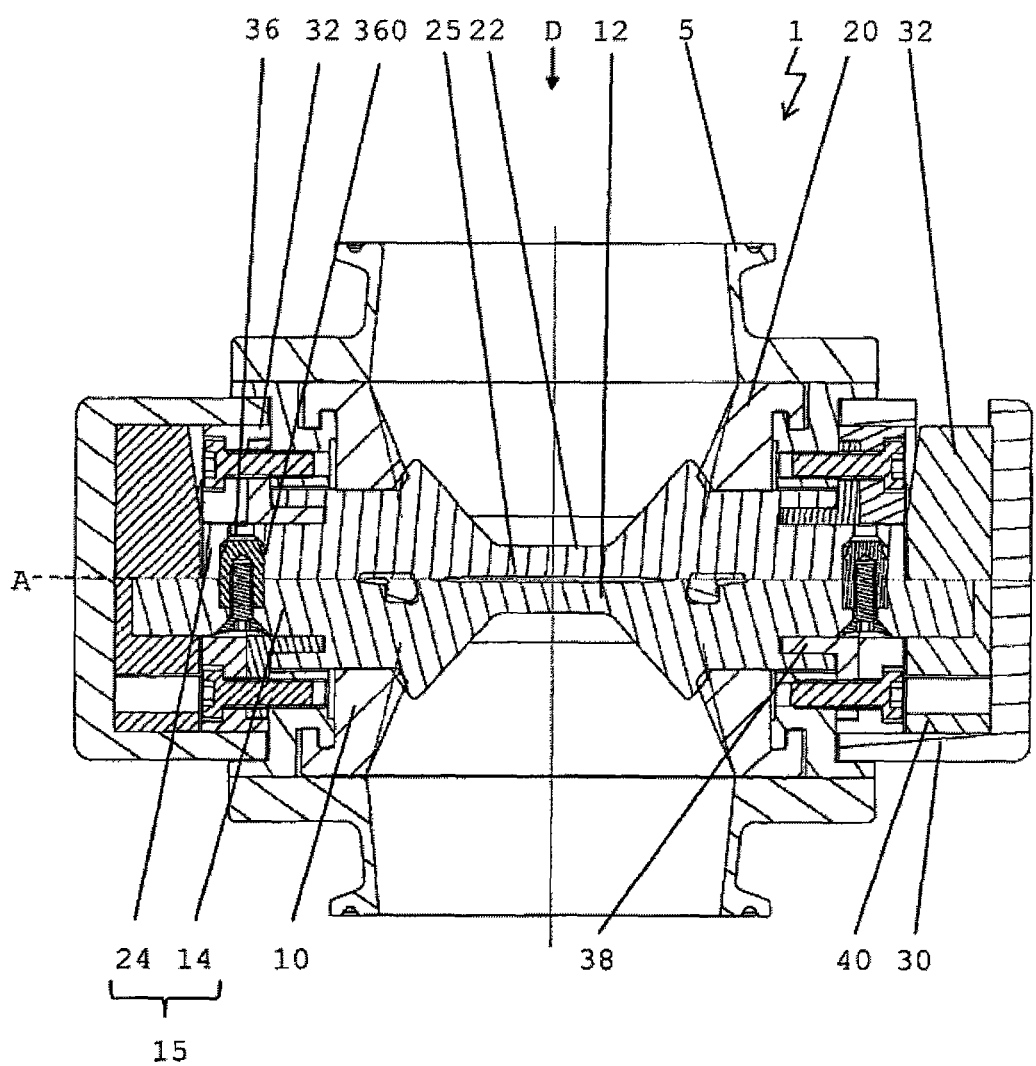
FIG. 6 shows a section through a dual flap device from FIG. 1 along the axis of rotation, wherein the housing halves are in the locking position according to FIG. 5.
Figure 7:
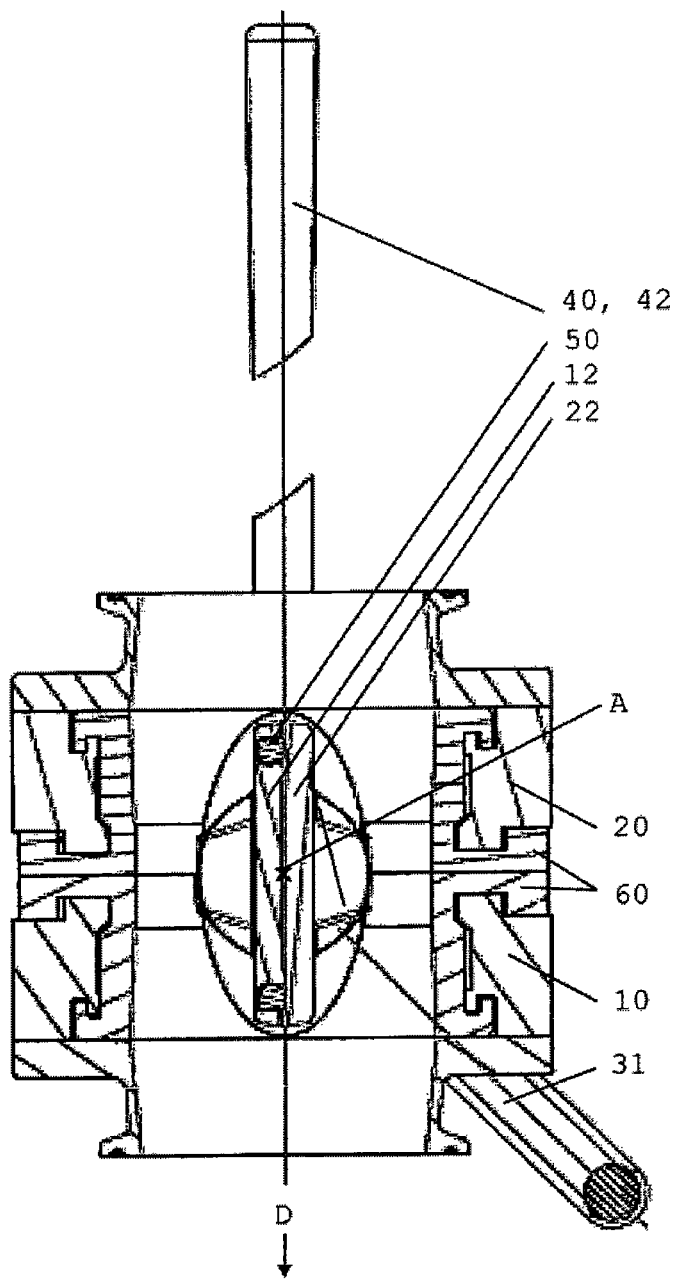
FIG. 7 shows a section through the dual flap device from FIG. 1 in the locking position according to FIG. 5, wherein the flaps are in an open position.
Figure 8:
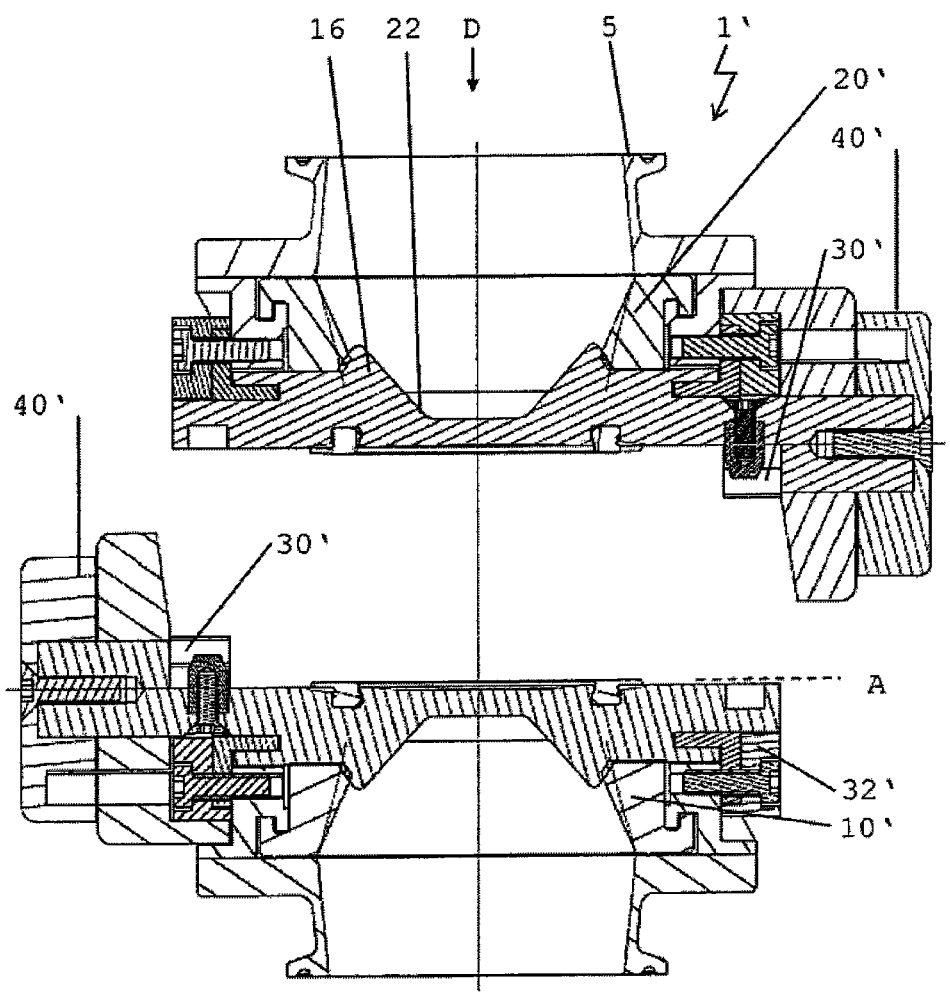
FIG. 8 shows a section through a dual flap device according to a second exemplary embodiment along the axis of rotation with two identical, closed housing halves which stand by rotated with respect to each other, oriented in the flow direction and spaced apart from each other, i.e. not yet docked on each other.
Figure 9:
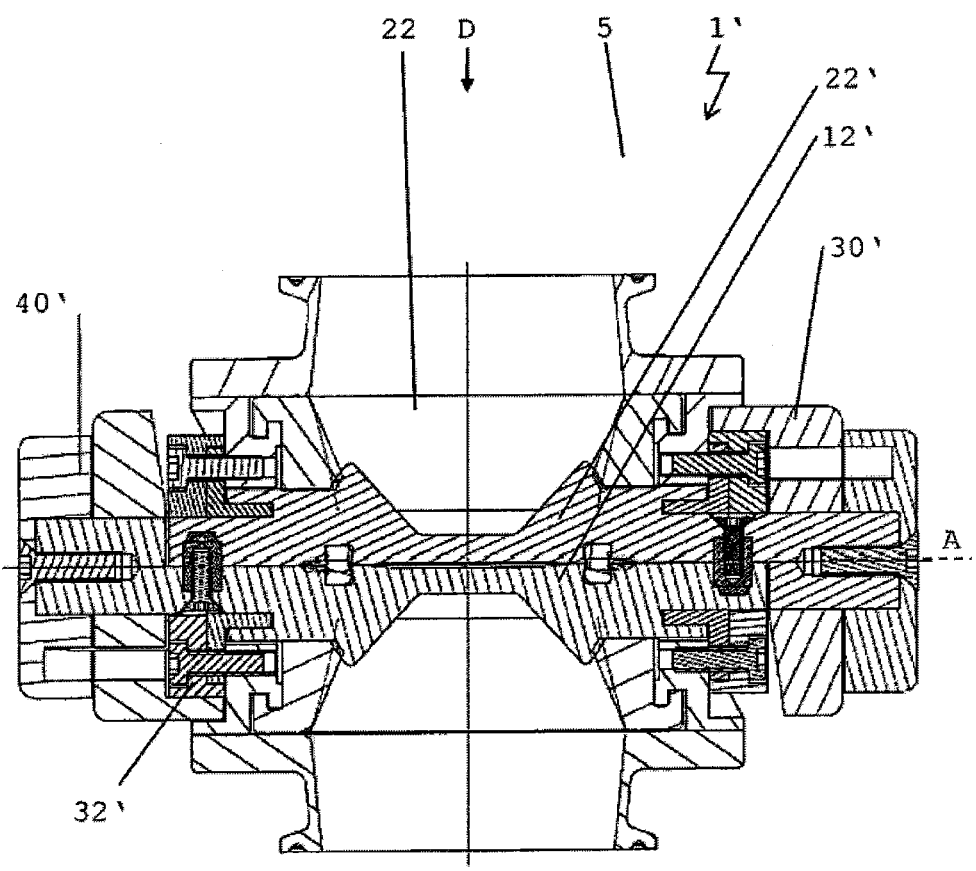
FIG. 9 shows a section through the dual flap device from FIG. 8, wherein the housing halves are docked on each other and the dual flap device is in an unlocking position.
Figure 10:
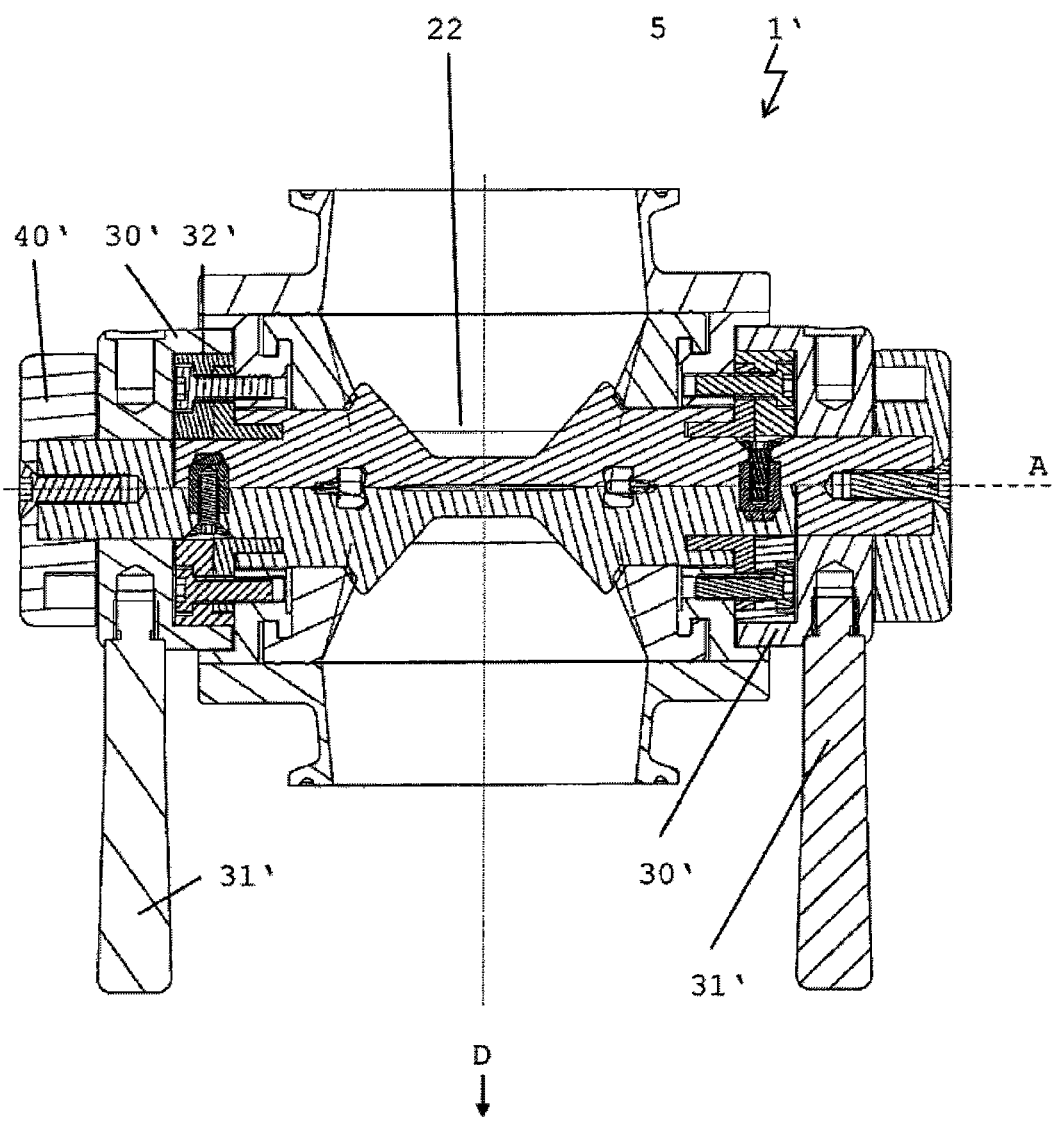
FIG. 10 shows a section through the dual flap device from FIG. 8 according to FIG. 9, wherein the dual flap device is in a locking position.

FIG. 4 shows the dual flap device 1 in the unlocking position. FIGS. 5 to 7 show the dual flap device 1 in the locking position.

In the locking position, the dual flap device 1 can be pivoted by means of an adjusting device 40 between a closed position (FIGS. 5 and 6) and an open position (FIG. 7). In the open position, the dual flap 12, 22 is oriented in the flow direction D.

The first housing half 10 is flange-mounted onto a first receptacle 3 on one side in the flow direction D. Said flange-mounting may be a welded connection between the first housing half 10 and a tube socket. The first housing half 10 has a hole centrally for the passage or transfer of the flow in the flow direction D.

Facing away from the first receptacle 3, the first housing half 10 has an annular sealing washer 60 lying in a plane transversely with respect to the flow direction D. In the sealing washer 60 or passing axially through the sealing washer 60 in the first housing half 10, a first flap 12 is mounted rotatably about an axis of rotation A. In the closed position, the first flap 12 closes the hole such that there is no flow through the first housing half 10. The axis of rotation A rests in a closing plane 11 on a surface of the sealing washer 60 that faces away from the receptacle 3. Coaxially with respect to the axis of rotation A, first half shafts 14 are connected to the first flap 12 on both sides of the first flap 12, as seen in the direction of the axis of rotation A. The half shafts 14 can also be integrally formed on the first flap 12 in the coaxial direction to the axis of rotation A. The first half shafts 14 therefore lie with the round circumference thereof in the sealing washer 60 and are rotatable therein. Accordingly, the mounting is realized in the form of a sliding bearing. As an alternative, other mountings, in particular with integrated control actuators which bring about rotation, are conceivable.

The first half shafts 14 are held in the first housing half 10 by bearing elements 38 such that the first flap 12 cannot drop out of the first housing half 10. The bearing elements 38 may be designed as bushings. In order to receive the bushings, grooves running in the circumferential direction are provided in the half shafts 14 on end sides facing away from the first flap 12.

The first flap 12 is of slightly convex design on the side of the closing plane 11, i.e. is slightly retracted into the first housing half in the direction of the flow direction D. In a region of the circumference of the first flap 12, the flap 12 has, on the side of the closing plane 11, an encircling groove into which a sealing ring 50 can be fitted. The sealing ring 50 particularly advantageously extends slightly beyond the circumference of the first flap 12 in the radial direction such that it covers part of the surface of the adjacent, first half shafts 14 on one side.

In an axial extension of the first half shafts 14, the first housing half 10 has an adjusting device 40 and a locking device 30 on both sides from the inside to the outside, as seen in the direction of the axis of rotation A. The adjusting device 40 on one side holds the respective first half shaft 14 for conjoint rotation and is itself at least partially rotatably mounted in the locking device 30. The two devices 30, 40 are therefore rotatable independently of each other about the axis of rotation A.

The first flap 12 has, facing the first receptacle 3, a first recess 16 into a central region, in which the first flap 12 is therefore designed to be as thin as possible. The recess 16 extends as far as possible toward the circumference of the first plate 12. Radially outer walls of the recess 16 nm in a flow-friendly continuation of the otherwise internal contour of the hole in the first housing half 10, said continuation changing the predetermined tubular cross section insubstantially, optionally slightly tapering said cross section.

In principle, the second housing half 20 is constructed similarly to the first housing half 10 in a manner matched to the first housing half 10. Instead of the devices 30, 40, the second housing half 20 has locking elements 32 in an axial extension of second half shafts 24 on both sides of a second flap 12. The locking elements 32 are designed in terms of the outer contour in the form of circular-cylindrical half cylinders, and therefore the locking device 30 of the first housing half 10 can enclose the locking elements 32 in a form-fitting manner when locking takes place.

The two housing halves 10, 20 can be connected releasably to each other or docked on each other. For this purpose, the housing halves 10, 20 have to be oriented with each other with respect to the respective axes of rotation such that they have a common axis of rotation A.

When the housing halves 10, 20 are oriented with respect to each other, opposite slopes 34 are formed on a half open circumferential wall of the locking device 30 in a parallel orientation with respect to the axis A. During docking, the locking elements 32, guided by the slopes 34, slide into the coaxial position in the locking device 30.

For precise adjustment, conically converging adjusting nipples 36 which pierce the closing plane 11 are integrally formed or fastened in the first half shafts 14. Corresponding centering bores 360 in the second half shafts 24 at positions opposite the adjusting nipples 36 are intended for receiving the latter. Catch regions of the slopes 34 and of the conically converging centering nipples 36 are designed to slightly overlap, thus ensuring good guidance of the housing halves 10, 20 during docking.

The bearing elements 38 of the two housing halves 10, 20 are each arranged in the housing halves 10, 20 for congruent rotation. If the housing halves 10, 20 are docked and the axes of rotation rest on each other, the bearing elements 38 also butt against each other by means of the partial circumferences thereof. It is thus ensured during rotation of the half shafts 14, 24 that, over the course of the rotation, the bearing elements 38 of one housing half 10 engage in the corresponding grooves of the half shaft 14, 24 of the other housing half 20, and vice versa.

The locking device 30 can be rotated by a locking lever 31 and the adjusting device 40 by a control lever 42. In addition to such configurations or alternative configurations of manual control elements, automated control elements can instead also be used, for example pneumatic, hydraulic or electric actuators.

FIGS. 8 to 11 show a dual flap device 1' according to a second exemplary embodiment in a comparable illustration of the operating positions of FIGS. 2, 4, 6 and 7.

The dual flap device 1' differs substantially by the arrangement of the devices 30', 40' on the housing halves 10', 20'. The receptacles of the closing flaps 12', 24' are designed virtually identically to the first exemplary embodiment.

In the second exemplary embodiment, the housing halves 10', 20' are of identical design, and therefore said housing halves, rotated through 180° in relation to each other, are matched precisely to each other and can be closed by each other. The locking devices 30' and the adjusting devices 40' are distributed in pairs on each side of the first or the second housing half 10', 20'. In consequence, each housing half 10', 20' has, opposite thereto, a locking element 32', a locking lever 31' and a control lever 42'.

Figure 11:
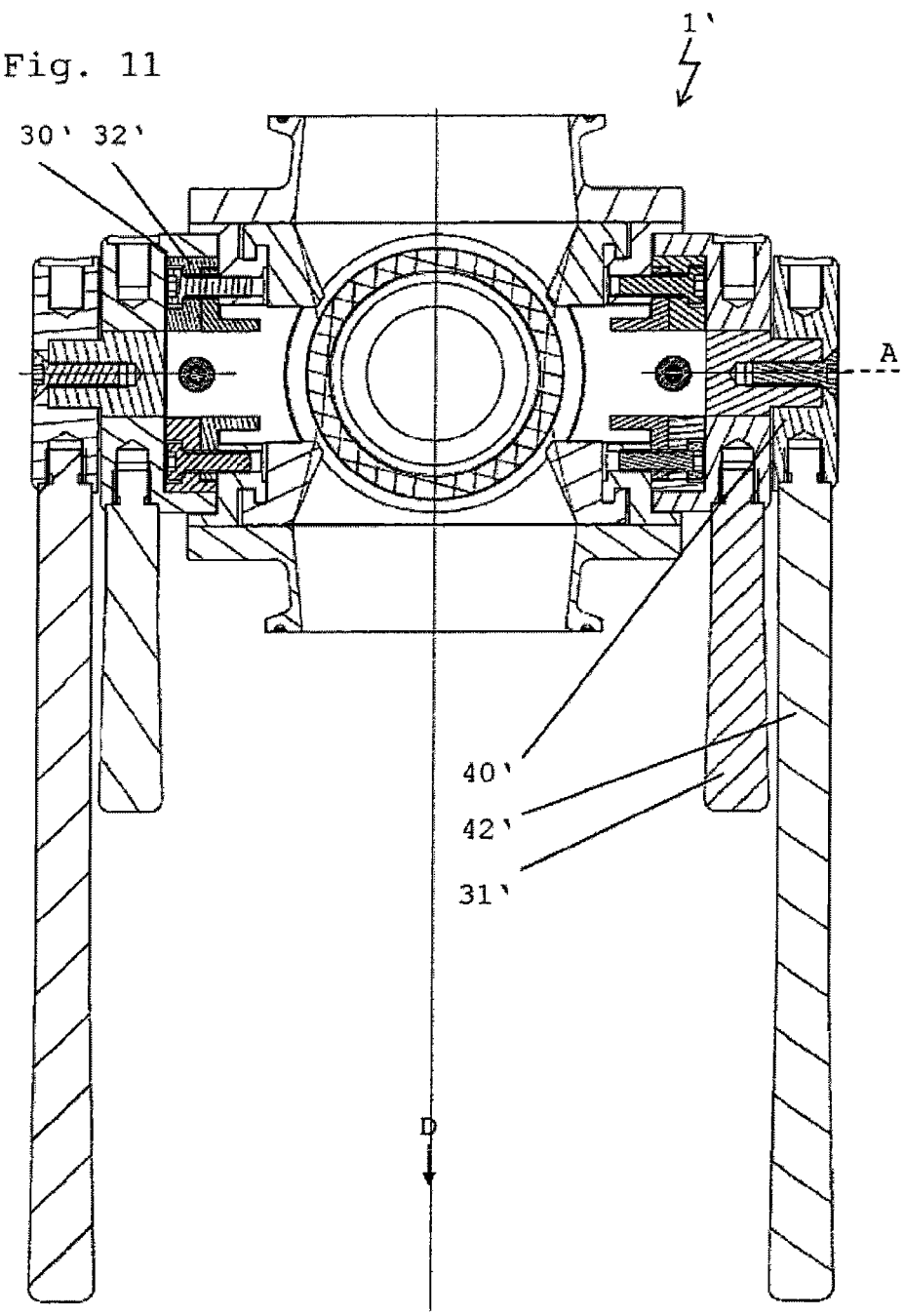
FIG. 11 shows a section through the dual flap device from FIG. 8 according to FIG. 10, wherein the flaps are illustrated in an open position.

As a result, even with the different arrangement of the levers 31', 42' of the second exemplary embodiment in comparison to the first exemplary embodiment, rotation of the first and of the second flap 12', 22' in the form of a dual flap into an open position according to FIG. 11 can be achieved.

Figure 12:
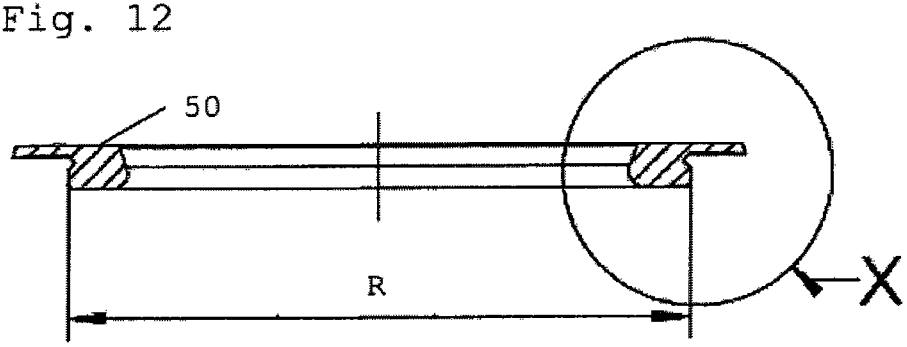
FIG. 12 shows a section through a sealing ring for the dual flap device from FIG. 1 or 8.
Figure 13:
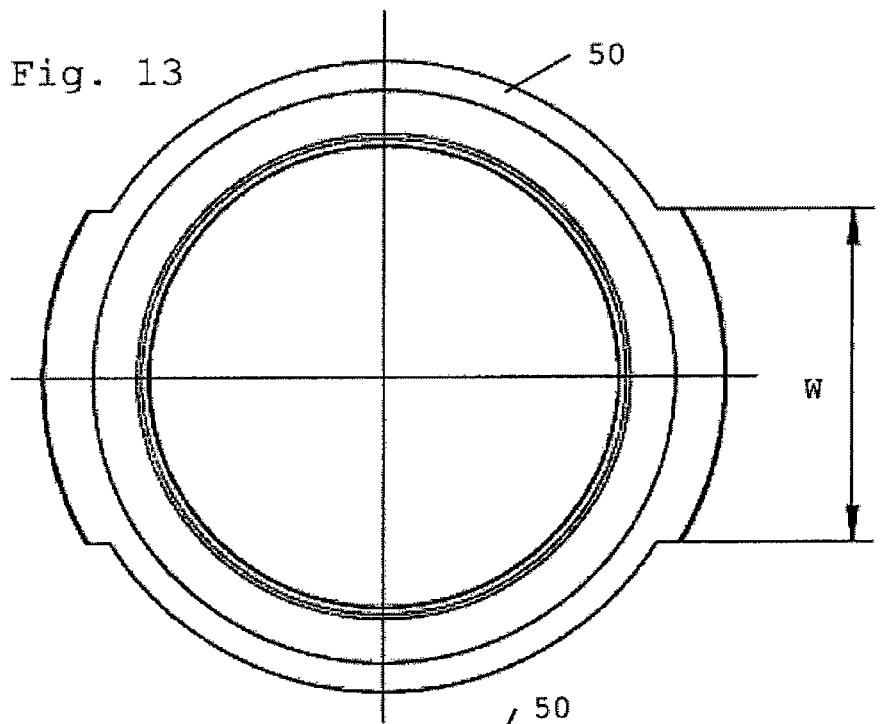
FIG. 13 shows a top view of the sealing ring from FIG. 12.
Figure 14:
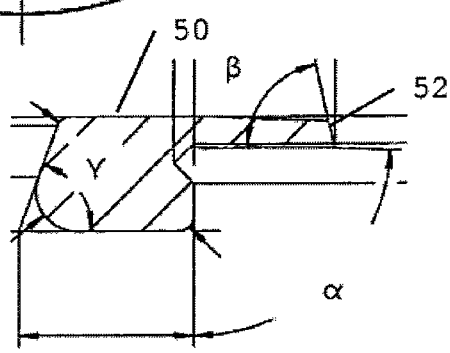
FIG. 14 shows a detailed illustration of the region identified by x in FIG. 12.

FIGS. 12 to 14 show the sealing ring 50 illustrated separately in two views and a detailed illustration. The fulfilling of the function of the sealing ring 50 in the sealing of the flaps 12, 12', 22, 22' and of the half shafts 14, 24 is achieved by expansion of the sealing ring 50 between the half shafts 14, 24. For this purpose, the sealing ring 50 is of wider design in opposite sections W of the circumference thereof on both sides in the direction of the axis of rotation A. In order to enable pivoting of the flaps 12, 12', 22, 22', the sealing ring 50 has to have a smaller diameter than the flap diameter of the flaps 12, 12', 22, 22', or at maximum the same diameter. The sealing ring 50 lies with said wider sections W between the half shafts 14, 24.

Particularly advantageously, side walls of the sealing ring 50 are designed to be beveled at angles $\beta$ and $\gamma$. In the respective section W, the sealing ring 50 is widened radially outward by a sealing lip 52 in the direction of the half shafts 14, 24, which receive the sealing ring 50 in the section W. The sealing lip 52 is inclined at an angle $\alpha$ toward the receiving half shaft 14, 24.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A dual flap device for an environmentally tight connection of two receptacles, comprising:
    two housing halves having a releasable connection therebetween;
    one flap per housing half, said flap being mounted pivotably in the associated housing half using a half shaft,
    wherein, in a connecting position of the dual flap device, the housing halves and the flaps bear against each other and are braced against each other, wherein the half shafts of the two flaps coincide to form a common shaft having an axis of rotation such that both flaps are pivotable using an adjusting device via the common shaft between a closed position and an open position, wherein, in the open position, a flowable product is transferable in a flow direction from a first into a second of the receptacles, wherein, in an axial extension of the respective half shaft, a first of the housing halves has, at least on one side of the respective flap, a locking device, wherein the locking device enables adjustment of the dual flap device between an unlocking position and a locking position, and wherein the locking device produces the releasable connection between the housing halves and braces the housing halves against each other.

2. The dual flap device as claimed in claim 1, wherein, in an axial extension of the respective half shaft, a second of the housing halves has, at least on one side of the respective flap, a locking element which, in the locking position, is at least partially engageable by the locking device of the first housing half.

3. The dual flap device as claimed in claim 1, wherein, in an axial extension of the respective half shaft, both housing halves each have a locking device on one side of the respective flap.

4. The dual flap device as claimed in claim 3, wherein, in the axial extension of the respective half shaft, both housing halves each have a locking element on a side of the respective flap opposite the locking device.

5. The dual flap device as claimed in claim 1, further comprising:
   a control element, which is common to the adjusting device and the locking device; and
   a coupling element, wherein the adjusting device and the locking device are couplable to each other using the coupling element in such a manner that, using the common control element, the releasable connection between the housing halves is produced and the housing halves are braced against each other in a first partial rotation, and, in a second partial rotation, the two flaps are pivoted via the common shaft between a closed position and an open position.

6. The dual flap device as claimed in claim 1, wherein at least one of the housing halves has a sealing washer which is arranged annularly around the respective flap and, together with the flap, lies in or parallel to a closing plane.

7. The dual flap device as claimed in claim 6, wherein the sealing washer is composed of plastic.

8. The dual flap device as claimed in claim 1, wherein at least one of the flaps has a sealing ring, the sealing ring being insertable, facing a closing plane between the housing halves, in an encircling groove of the flap.

9. The dual flap device as claimed in claim 8, wherein, upon docking of the housing halves, the sealing ring is deformed, and, at least over the course of the deformation, has a larger circumference than the flaps such that the sealing ring protrudes into a sealing region between the half shafts.

10. A method of using a dual flap device in a process engineering system, the method comprising:
    connecting two receptacles using the dual flap device, wherein the dual flap device includes:
      two housing halves having a releasable connection therebetween;
      one flap per housing half, said flap being mounted pivotably in the associated housing half using a half shaft,
    wherein, in a connecting position of the dual flap device, the housing halves and the flaps bear against each other and are braced against each other, wherein the half shafts of the two flaps coincide to form a common shaft having an axis of rotation such that both flaps are pivotable using an adjusting device via the common shaft between a closed position and an open position, wherein, in the open position, a flowable product is transferable in a flow direction from a first into a second of the receptacles, wherein, in an axial extension of the respective half shaft, a first of the housing halves has, at least on one side of the respective flap, a locking device, wherein the locking device enables adjustment of the dual flap device between an unlocking position and a locking position, and wherein the locking device produces the releasable connection between the housing halves and braces the housing halves against each other.

11. The method as claimed in claim 10, wherein, in an axial extension of the respective half shaft, a second of the housing halves has, at least on one side of the respective flap, a locking element which, in the locking position, is at least partially engageable by the locking device of the first housing half.

12. The method as claimed in claim 10, wherein, in an axial extension of the respective half shaft, both housing halves each have a locking device on one side of the respective flap.

13. The method as claimed in claim 12, wherein, in the axial extension of the respective half shaft, both housing halves each have a locking element on a side of the respective flap opposite the locking device.

14. The method as claimed in claim 10, wherein the dual flap device further includes:
    a control element, which is common to the adjusting device and the locking device; and
    a coupling element, wherein the adjusting device and the locking device are couplable to each other using the coupling element in such a manner that, using the common control element, the releasable connection between the housing halves is produced and the housing halves are braced against each other in a first partial rotation, and, in a second partial rotation, the two flaps are pivoted via the common shaft between a closed position and an open position.

15. The method as claimed in claim 10, wherein at least one of the housing halves has a sealing washer which is arranged annularly around the respective flap and, together with the flap, lies in or parallel to a closing plane.

16. The method as claimed in claim 15, wherein the sealing washer is composed of plastic.

17. The method as claimed in claim 10, wherein at least one of the flaps has a sealing ring, the sealing ring being insertable, facing a closing plane between the housing halves, in an encircling groove of the flap.

18. The method as claimed in claim 17, wherein, upon docking of the housing halves, the sealing ring is deformed, and, at least over the course of the deformation, has a larger circumference than the flaps such that the sealing ring protrudes into a sealing region between the half shafts.

* * * * *